United States Patent [19]

Dyer

[11] Patent Number: 4,921,268
[45] Date of Patent: May 1, 1990

[54] TRANSPORT DOLLY

[76] Inventor: Ronald Dyer, 2502 NE. Fourth Plain, Vancouver, Wash. 98661

[21] Appl. No.: 405,113

[22] Filed: Sep. 8, 1989

Related U.S. Application Data

[63] Continuation of Ser. No. 186,612, Apr. 27, 1988, abandoned.

[51] Int. Cl.$^5$ .......................... B60P 3/12; B62D 13/00
[52] U.S. Cl. ...................................... 280/402; 280/42;
280/412; 414/537; 414/563
[58] Field of Search .................. 280/402, 491.1, 491.2,
280/491.3, 491.4, 656, 42, 412, 413; 414/537,
563

[56] References Cited

U.S. PATENT DOCUMENTS

| | | | |
|---|---|---|---|
| 2,541,582 | 2/1951 | Hawkins | 280/402 |
| 2,701,069 | 2/1955 | Hawkins | 280/402 X |
| 3,311,245 | 3/1967 | Galey | 414/537 |
| 3,361,277 | 1/1968 | Johnson et al. | 414/537 X |
| 3,613,921 | 10/1971 | Ryden et al. | 414/537 |
| 3,661,286 | 5/1972 | Smith | 280/149.2 |
| 3,690,482 | 9/1972 | Gaumont | 414/563 |
| 3,979,133 | 9/1976 | Morris | 280/42 |

FOREIGN PATENT DOCUMENTS

| | | | |
|---|---|---|---|
| 2250323 | 5/1975 | France | 280/402 |
| 793834 | 1/1981 | U.S.S.R. | 280/402 |
| 1488277 | 10/1977 | United Kingdom | 280/402 |
| 2189442 | 10/1987 | United Kingdom | 280/402 |

Primary Examiner—Mitchell J. Hill
Attorney, Agent, or Firm—Olson and Olson

[57] ABSTRACT

An object or vehicle transporting dolly supporting one elevated object end comprising of a pair of mounting pads and transporting wheels each connected to a pair of vertically pivoting control arms which have also a vertical pivot connection to a center parallel control member which then can be fixed to a draw and steering control tongue. The scissoring control arms provide for handling multiple widths of objects. A frame connection rack or a wheel well for dollying of wheeled vehicles can be fixed to the mounting pad and can optionally swivel on the mounting pad. Articulation between the towing and towed vehicles force the tongue and control arms to direct the mounting pads and the trailering wheels to maintain a longitudinal alignment to the draw control tongue, even though they are in a fixed longitudinal position to the transport object causing king-pin type of steering with the swivelling at the mounting pad. With the use of a "v" draw tongue pivoting at the wheel pads, the dolly can be towed in a castering mode. Without the use of the draw control tongue or the swivelling mounting pads, this dolly can be used to transport the elevated rear of an object or vehicle. Multiple dollies can be interconnected and optionally framed for one end up or complete object trailering with rear wheel steering as an option.

17 Claims, 8 Drawing Sheets

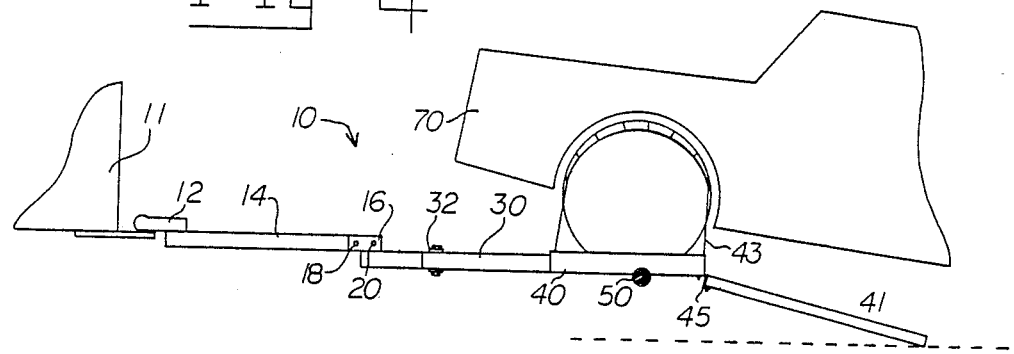
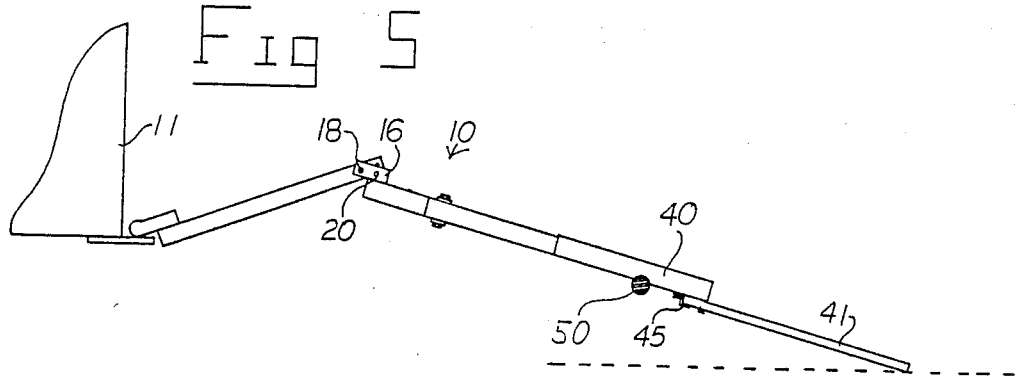
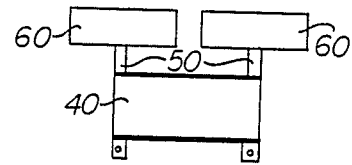
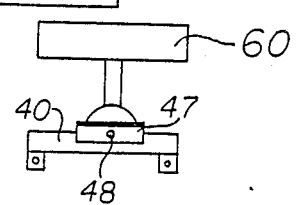

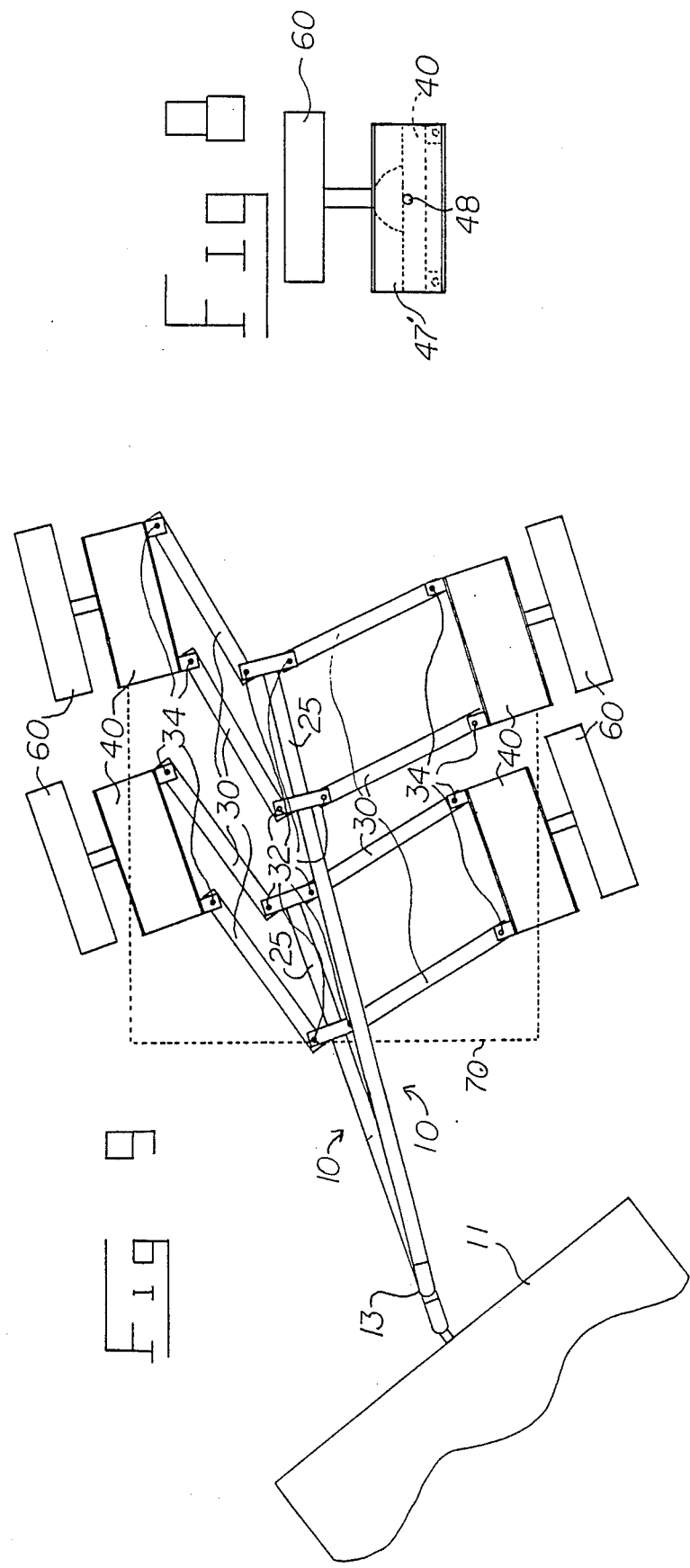

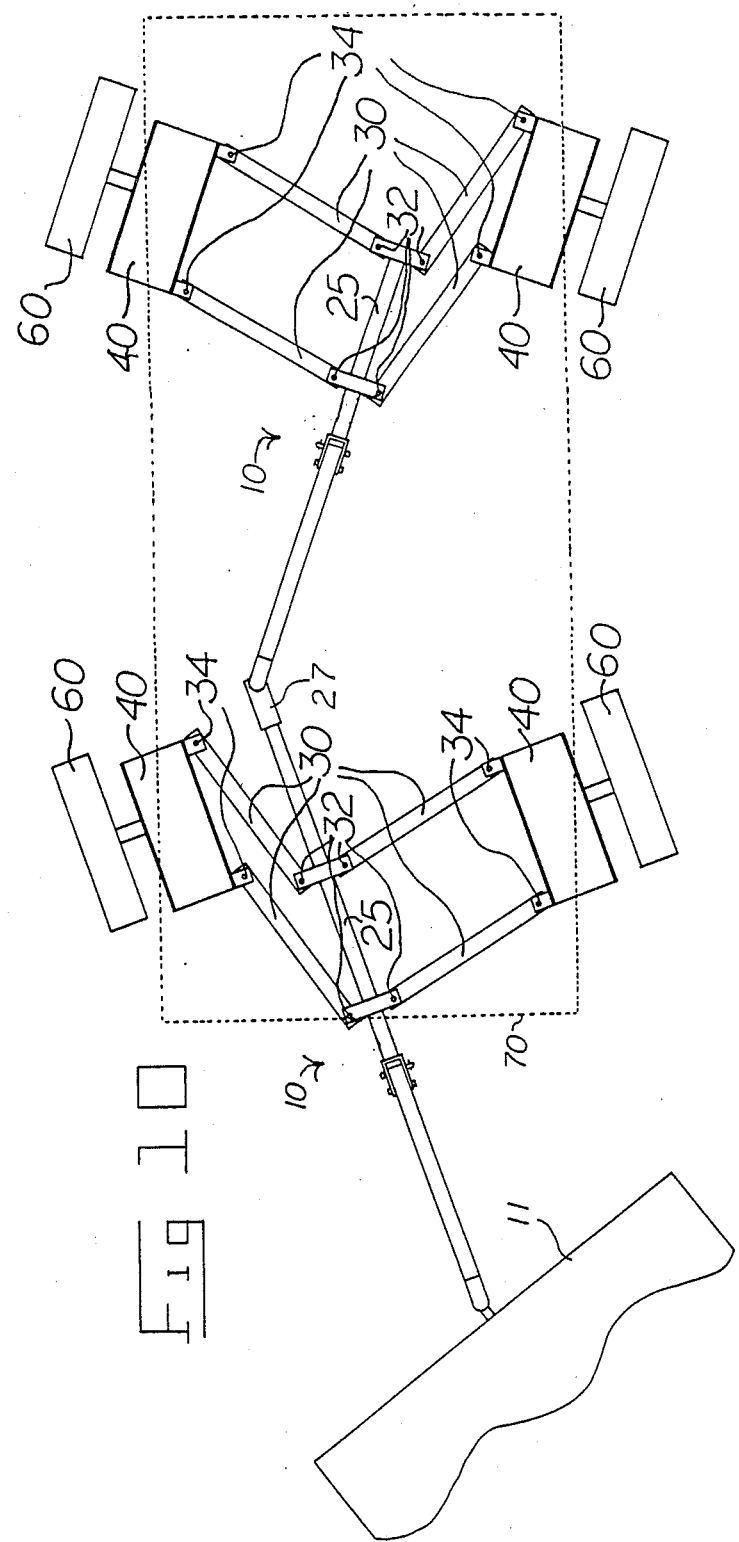

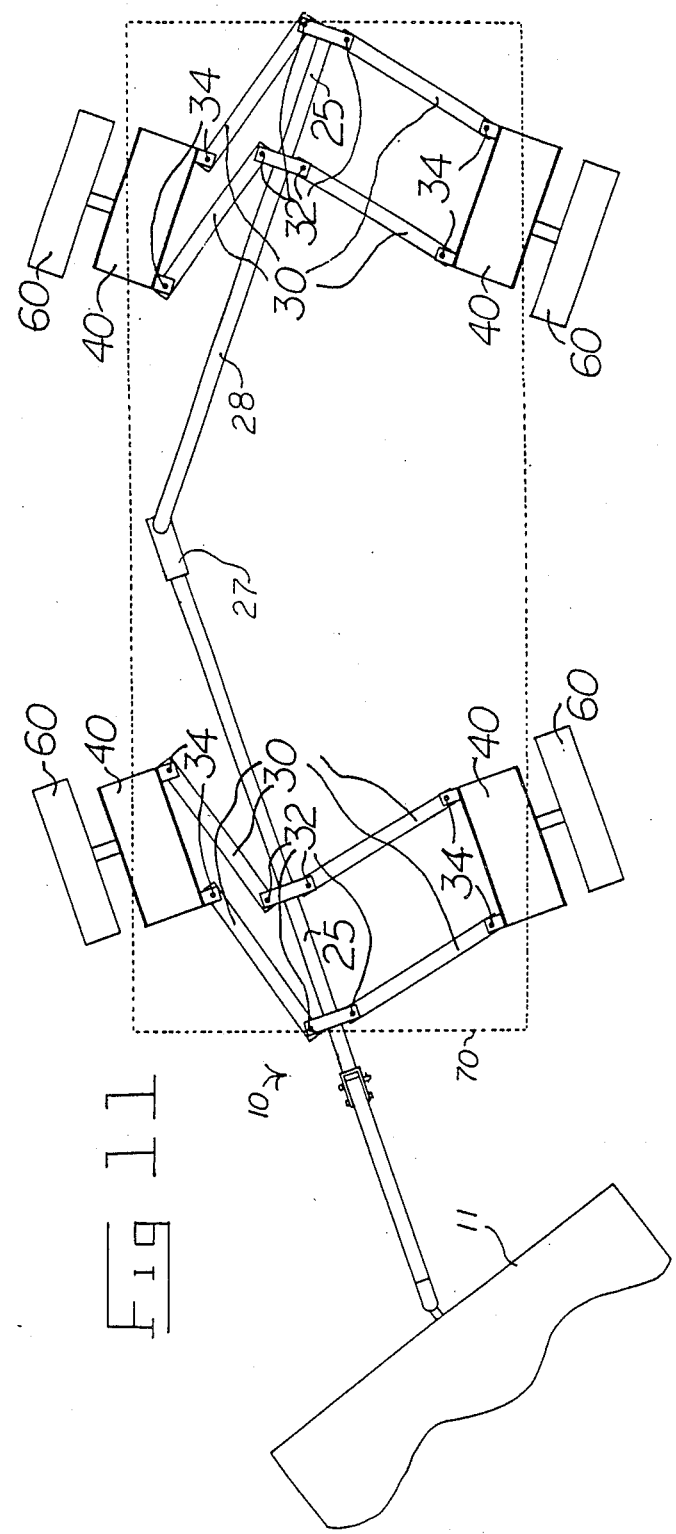

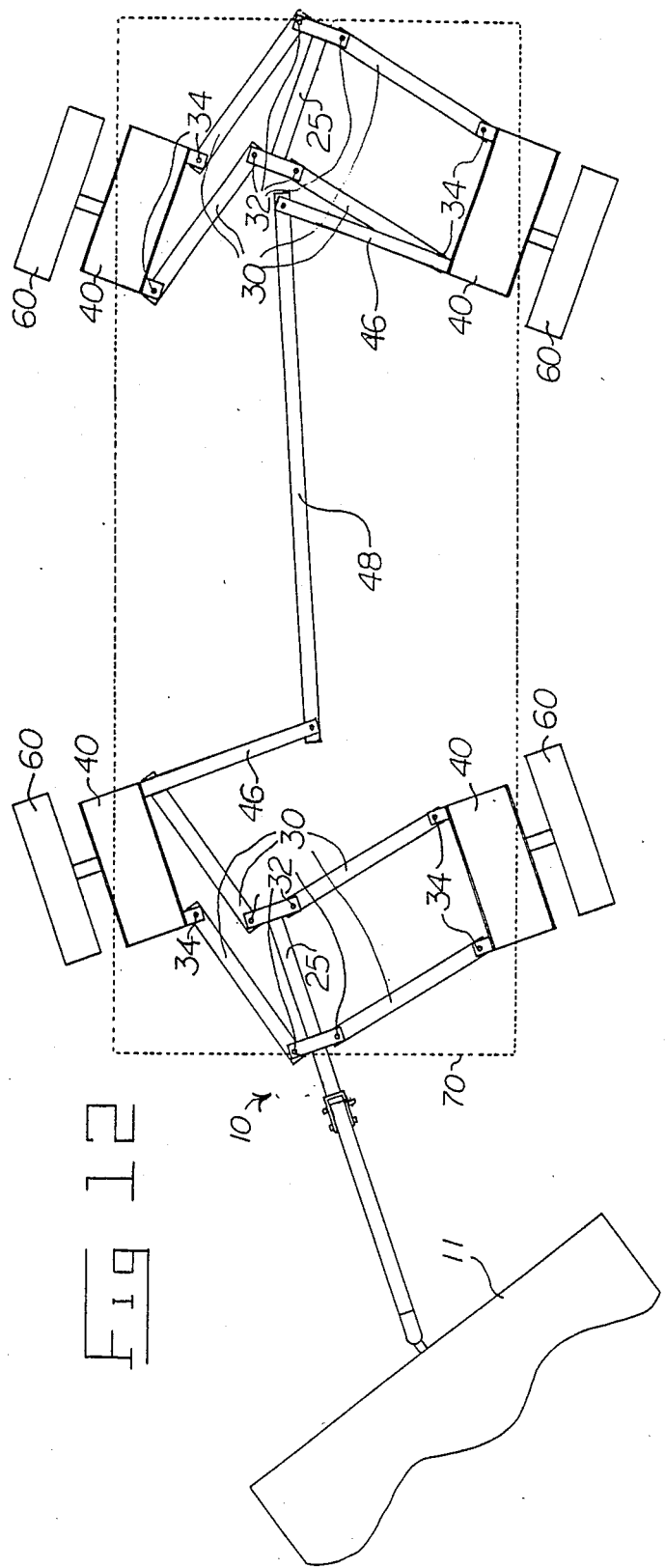

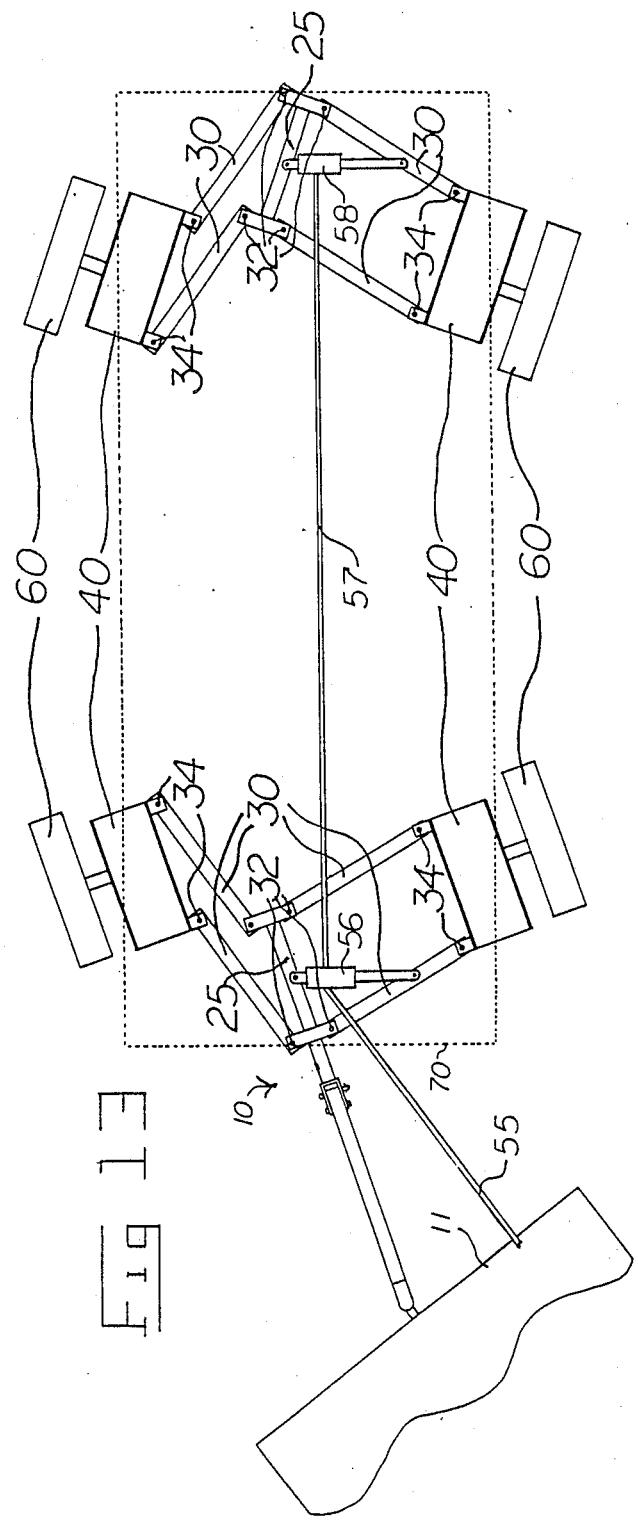

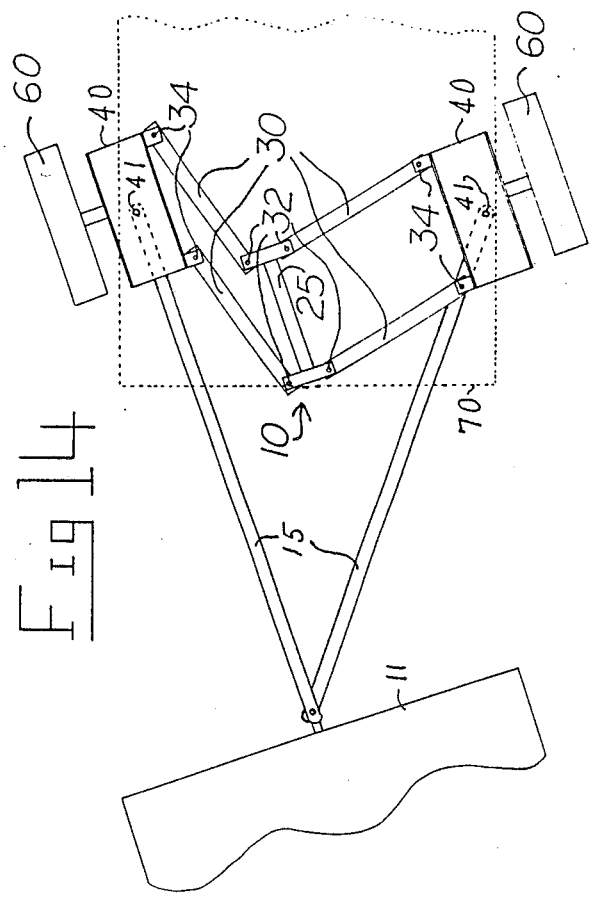

TRANSPORT DOLLY

CROSS REFERENCE TO RELATED APPLICATION

This application is a continuation of the earlier filed application, Ser. No. 186,612 filed 27 Apr. 1988 now abandoned.

BACKGROUND OF THE INVENTION

This invention relates to a dolly for one end supported transporting of a ramp loaded wheeled object, or a jack loaded unwheeled object, from something as small as garden tractors and golf carts to an automobile and to larger yet construction and farm equipment. Also sheds, buildings, bridge rails, mobile homes, etc, are transported on one or more dollies on one or both ends.

Rather than transporting an automobile or heavy equipment completely upon a trailer, just one end is loaded. A wheeled object is connected only by the front or rear wheels. No bumper or frame connection is required as for a tow bar. Also many of the rubber bumpers on automobiles preclude the attachment of a tow bar. What this invention relates to is a wheel latching rolling tow bar.

Prior art requires different sizes of dollies for different widths of vehicles. The loading ramps are in a fixed position with large vehicles not fitting on a narrow dolly and small vehicles not fitting on a wide dolly.

The prior art utilizes haywagon type of steering with a swivelling loading platform that maintains position with the towed vehicle. This passes road impact stresses down the tongue and on to the towing vehicle.

Another version of prior art utilizes castering wheels with the draw tongue and towed vehicle latched to a rigid longitudinal position with all of the towed vehicle mass being passed down the draw tongue to the towing vehicle when turning a corner or hitting a rut in the road.

Another need is for an end customer-assembleable automobile sized dolly that can be marketed and delivered in a box. Prior art is completely welded with all 500 to 600. pounds trailered to the end customer. An assembleable dolly could also be disassembled for storage under a bench when not in use.

Another limitation of prior art for automobiles is for loading vehicles that are disabled and not rolling such as a smashed car. There is no way to jack up the car under a cross member or differential and set it down on the dolly supporting platform.

In the automobile towing industry, there is a need for a variable width dolly to be latched to the wheels of the non-lifted end. Prior art requires assembly of components to a fixed width depending on the size of car being loaded.

Also large objects and equipment need to be hauled from one site to another. A larger version of the dolly is needed for frame or wheel attachment and for one end up or both end up transporting of these objects. When long objects are trailered on two or more dollies, there is a need to have the rear wheels steer in the opposite direction for less corner cutting. For these large objects, there is a need for multiple dollies to be attached to one or both ends with the possibility of all dollies being able to steer.

SUMMARY OF THE INVENTION

The present invention will provide a one end up variable width object transporting dolly with king-pin type steering controlled by a draw control tongue and intervehicle articulation. The transporting wheels are in a fixed widthwise and longitudinal position to the transported object but will pivot at the object support mounting pads through four pivoting control arms attached to the center parallel control member and the draw control tongue during inter-vehicle articulation. It is by virtue of the foregoing basic concept that the principle objective is achieved.

Another object is to provide a transporting dolly of the class described that can be fixed to multiple widths of load objects by just widening or narrowing the distance between the trailering wheels through the four pivoting control arms and the center parallel control member.

Another object of this invention is to provide a horizontally pivoting draw control tongue and loading ramps that will tilt for loading of rolling wheeled vehicles.

A further object of this invention is to provide for an absence of structure between the two mounting pads so an object to be transported can be jacked up between the mounting locations and the dolly backed under without interfering with the jack.

A further object of this invention is to provide for a customer-assembleable automobile sized dolly that can be disassembled for storage.

A further object of this invention of for the dolly to be utilized as a rear end transporting dolly with the draw control tongue being functionless and optionally removed, and with the mounting pads not swivelling.

A further object of this invention is to provide a variable width castering dolly with a "v" tongue pivoting at the mounting pads allowing a transported vehicle to be backed up in the same manner as a trailer or a tow bar.

A further object of this invention is to provide for multiple dollies to be attached to an object with the front dollies steering progressively less as controlled by the draw control tongue and the piggy-back inter-tongue connection. The rear end of the object can also be supported by a rear dolly or set of dollies and can be just a support dolly or it can provide rear wheel steering in the opposite direction controlled by a front and rear dolly mechanical and/or hydraulic interconnection.

The dolly or dollies can be mounted on a frame for front only, middle only castering, rear only supporting, rear only supported steering, or the frame can be extended for complete object trailering.

The foregoing and other objectives and advantages of this invention will appear from the detailed description taken in connection with accompanying drawings of the preferred embodiments.

Any detail or other option not described does not preclude its inclusion within the spirit and scope of this invention.

BRIEF DESCRIPTION OF THE DRAWINGS

FIG. 4 is a schematic side elevation at the axle of the dolly with a vehicle loaded using a removable ramp;

FIG. 5 is a schematic side elevation at the axle of the dolly showing the fixed ramp and tilting tongue vehicle loading position;

FIG. 6 is a schematic plan view of a mounting pad utilizing multiple wheels for each side of the transporting dolly;

FIG. 7 is a schematic plan view of a frame mount or equipment swivelling mounting pad;

FIG. 8 is a schematic plan view of a swivelled wheel well mounting pad;

FIG. 9 is a schematic plan view of muliple dollies in a piggyback mode;

FIG. 10 is a schematic plan view of multiple articulating dollies for complete object trailering utilizing both end steering;

FIG. 11 is a schematic plan view of multiple dollies for both end steering utilizing dual stingers;

FIG. 12 is a schematic plan view of multiple dollies for both end steering utilizing a mechanical tie bar;

FIG. 13 is a schematic plan view of multiple dollies for both end steering utilizing hydraulic means for control and rear wheel steering power.

FIG. 14 is a schematic plan view of a castering dolly including a "v" draw tongue with a pivot joint attachment to the steering pivot point under the mounting pads.

DESCRIPTION OF PREFERRED EMBODIMENTS

Figure 1:
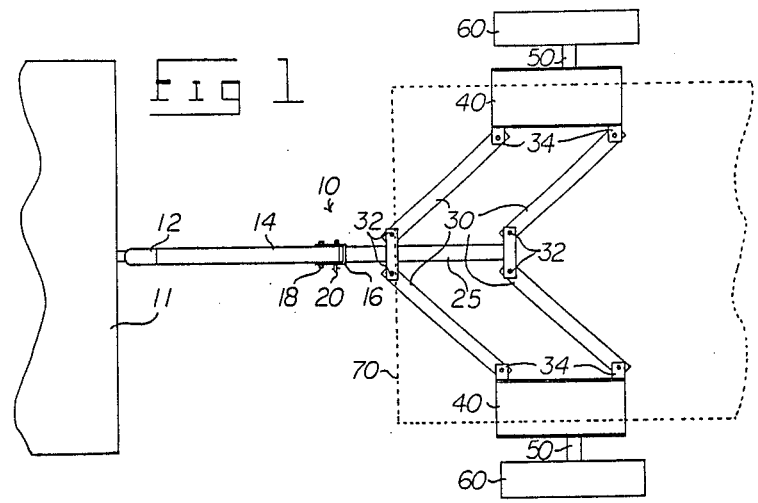
FIG. 1 is a schematic plan view of a vehicle towing dolly embodying the invention.

In the drawings, the transporting dolly of the present invention is designated in its entirety by the reference numeral 10.

FIG. 1 illustrates the top schematic plan view of a vehicle transporting dolly with wheel wells 40 for attachment to the transported vehicle 70 front or rear wheels. The draw control bar 14 is attached with a conventional trailer hitch and coupler 12 to the pulling vehicle 11. The parallel control member 25 is attached to the mounting pads 40 with vertically pivoting joints 32 at the parallel control member, vertical pivot joints 34 at the mounting pads and with control arms 30 connecting the pivoting joints at the weight pivots 32, 34. From the drawings it will be apparent that lines extended through the axes of the pivots 32, 34 of each lateral pair of control arms 30 form a parallelogram. It is by this arrangement that the laterally spaced pair of mounting pads 40 remain parallel to each other throughout the range of independent lateral movement illustrated in FIGS. 1, 2 and 3. The joints 34 could be under and toward the center of the mounting pad 40 or even near the outside edge for better horizontal leverage. Axles 50 are attached to the mounting pads and are of conventional art being fixed axle, drop axle, torsioned axle, or spring-mounted axle for one more wheels 60 on each side. When the mounting pads 40 are attached to the transported vehicle 70 wheels, the mounting pads will take and remain in this position to the transported vehicle 70 during the stopping and pulling action of the pulling vehicle 11 even though the control arms 30 try to scissor the mounting pads 40 together and apart. The mounting pad 40 width between each other and their individual longitudinal position are fixed by the transported vehicle, with wider vehicles requiring the control arms 30 scissoring wider, and narrower vehicles requiring the control arms 30 scissoring narrower.

If the transported vehicle was damaged and one of its wheels on the transported end was further back than the undamaged side, one of the mounting pads 40 would be further back with the control arms 30 on each side not being symmetrical and causing the parallel control member 25 to be closer to the damaged side.

Note that the transported vehicle 70 in this and all the following figures could be an object that is transported or a frame upon which the dolly is tied to the object.

Figure 2:
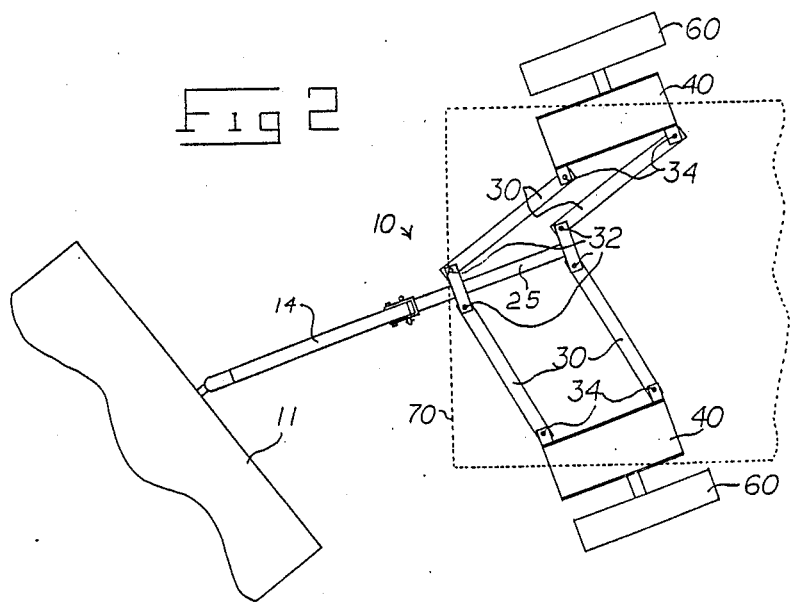
FIG. 2 is a schematic plan view of the dolly showing the inter-vehicle articulation movement of all of the dolly components providing for the articulated steering.

FIG. 2 illustrates the turning technique of this invention that is caused by inter-vehicle articulation. Specifically, the draw control tongue 14 is pulled toward one side of the transported vehicle 70. The parallel control member 25 is longitudinally fixed to the draw control tongue 14 and pushes and pulls on the control arms 30 which in turn push and pull on the mounting pads 40 causing the mounting pads 40 and the transporting wheels 60 to maintain longitudinal alignment to the draw control tongue 14 with swivelling at the mounting pad either through the steering of the transported vehicle or between the mounting pad 40 and the tire of the transported vehicle if a non-steering end is transported.

In the above described way, a transported vehicle 70 will trail a towing vehicle 11 with king-pin type of steering.

Figure 3:
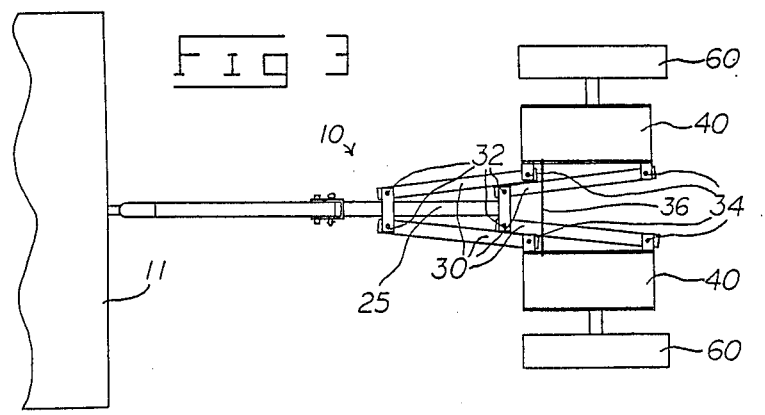
FIG. 3 is a schematic plan view of an unloaded dolly latched to its narrow trailering position.

FIG. 3 is an unloaded dolly with its width narrowed and fixed by a widthwise latching bar 36. A wider bar with pivoting connections can be utilized to stabilize and fix the width for loading transported objects.

FIG. 4 illustrates a side view of the dolly with the wheel 60 not shown. This view is of a front loaded vehicle utilizing the ramps 41 in a removable mode with the ramp bracket 45 over top and resting on the wheel well pads. Note that the tilt action of the tongue is not utilized in this mode. The main advantage of this mode is that the ramp is removed when the vehicle is being towed and will not hit or scrape the vehicle undercarriage when at a crest of a driveway or roadway. Also prevented is scraping of the pavement in a valley of a driveway or roadway.

FIG. 5 is a side view, again with the transporting wheel removed, showing the tilt action at the tilt joint 16 with the tilt pin 20 removed allowing the tongue to tilt longitudinally about the widthwise horizontal plane on the tilt pivot bolt 18. In this mode the ramps 41 are in a fixed position with the ramp bracket 45 mounted under the mounting pad 40. The tilting action stops only when the ramp 41 makes contact with the road surface. When the vehicle is loaded, the center of gravity over the transporting wheels rocks the wheel pads and ramps down at the front end straightening out the tilt action of the tongue. When the tilting tongue is back to its normal position, the tilt pin 20 is manually reinserted and clipped to fix the tilting into the normal position.

FIG. 6 illustrates a wheel pad 40 with dual axles 50 and transporting wheels 60 for horizontal stability when attached to the rear wheels of a transported vehicle. No tongue is necessary in this mode.

FIG. 7 illustrates a swivelling frame mount 47 with the swivelling joint 48 attaching it to a narrow mounting pad 40 for attaching the mount 47 to a frame when transporting unwheeled objects or as a frame mount for wheeled equipment.

FIG. 8 illustrates a wheel well mount 47 with a swivel joint 48 attaching it to the mounting pad 40. This swivelling mounting pad would be utilized for transporting the non-steering end of a vehicle when the swivelling between the tire and the fixed mounting pad is not considered adequate.

FIG. 9 illustrates a multiple of dollies 10 in a piggybacked attachment swivel joint 13 to interconnect the tongues for multiple dolly steering at one end of a transported object.

FIG. 10, FIG. 11, FIG. 12, and FIG. 13 illustrate multiple dollies embodying the same scissoring arms for both end object trailering with rear wheel steering in the opposite direction controlled only by the intervehicle articulation. The various techniques of rear stinger to tongue, rear stinger to rear stinger, mechanical tie bar, and hydraulic control and ram are in no way intended to be an exhaustive set of alternatives.

FIG. 10 utilizes two dollies 10, with the front dolly having a rear telescoping swivelling stinger 27 extending from the parallel control member. The rear dolly is attached to that stinger providing for rear dolly steering as described above regarding FIG. 2.

FIG. 11 illustrates a rear facing rear dolly including a stinger 28 with a coupler for a swivel connection to the front stinger 27. This rear facing dolly configuration will allow multiple dollies to be attached at each end as described in FIG. 9, all of which would have steering controlled by the inter-vehicle articulation.

FIG. 12 illustrates multiple dollies with a fixed arm 46 extending from the mounting pad with a swivelling joint for connection of a steering tie bar 48 to the rear supporting dolly or dollies.

FIG. 13 illustrates a hydraulic source 55 attached to a hydraulic control 56 with a tie line 57 for powering the hydraulic ram 58 to control the steering of the rear supporting dolly or dollies.

FIG. 14 illustrates a variable width castering transporting dolly including a "v" draw tongue 15 fixed, with a pivot attachment 44 to the steering pivot point on the wheel pads 40, in a longitudinal position to the transported object 70 and the mounting pads 40, allowing the wheel pads to caster whether the transporting vehicle 11 is pulled forward or pushing backward. The advantage of this mode is that the transported object can be backed up the same as with a tow bar or trailer.

It is to be noted from the drawings that the pivots 32, 34 of each pair of control arms 30 are arranged to form a parallelogram. It is by this arrangement that the pair of mounting pads 40 remain parallel to each other throughout the range of lateral movement of the pads toward and away from each other.

It will be apparent to those skilled in the art that various changes and combinations other than those discussed may be made in the size, shape, type, number and arrangement of the parts described hereinbefore and could take various other forms within the scope and spirit of the following claims:

I claim:

1. A transport dolly comprising:
   (a) a control member,
   (b) a pair of mounting pad members,
   (c) first and second pairs of control arms disposed on opposite lateral sides of the control member, first pivot means securing one end of said first pair of control arms pivotally to the control member, second pivot means securing one end of said second pair of control arms pivotally to the control member, each of said first and second pairs of control arms adapted for pivotal movement of each of said first and second pairs of control arms independently of the other of the said first and second pairs of control arms, third pivot means securing the other end of the control arms of the first pair pivotally to one of the pair of mounting pad members, and fourth pivot means securing the other end of the control arms of the second pair pivotally to the other of the pair of mounting pad members, for moving the mounting pad members independently laterally toward and away from each other, lines extending through the axes of the four pivot means of each pair of control arms forming a parallelogram, whereby the pair of mounting pad members remain parallel to each other throughout the range of said lateral movement, and
   (d) supporting wheel means secured for rotation in planes parallel to each mounting pad member.

2. The transport dolly of claim 1 including latch means releasably interengaging the pair of mounting pad members in a laterally retracted position of the pad members.

3. The transport dolly of claim 1 including draw bar means connected at one end to the dolly and arranged at the opposite end for connection to a towing vehicle.

4. The transport dolly of claim 3 wherein the draw bar means comprises a tongue member secured at one end to one end of the control member and arranged at the opposite end for connection to a towing vehicle.

5. The transport dolly of claim 4 including pivot means interconnecting the tongue member and control member for pivoting said tongue and control members on a transverse axis.

6. The transport dolly of claim 5 including pivot lock means releasably interengaging the tongue member and control member for releasably securing said tongue and control members together against pivotal movement on the said transverse axis of said pivot means.

7. The transport dolly of claim 3 wherein the draw bar means comprises a pair of tongue members each secured at one end pivotally to a different one of the pad members and arranged at its opposite end for connection to a towing vehicle.

8. The transport dolly of claim 3 including pivot means on the draw bar means for pivotally connecting the draw bar means of a second dolly positioned behind the first named dolly.

9. The transport dolly of claim 3 including an extension member secured to and extending rearwardly from the control member, and pivot means on the rearward end of the extension member for pivotally connecting thereto the tongue member of a second dolly positioned behind the first named dolly.

10. The transport dolly of claim 1 wherein the supporting wheel means comprises a single wheel secured to each pad member.

11. The transport dolly of claim 1 wherein the supporting wheel means comprises a pair of wheels secured to each pad member in longitudinally spaced apart arrangement.

12. The transport dolly of claim 1 including load mount means overlying each pad member and secured pivotally thereto for relative pivotal movement about a substantially vertical axis.

13. The transport dolly of claim 12 wherein the load mount means comprises a frame mount.

14. The transport dolly of claim 12 wherein the load mount means comprises a wheel well mount.

15. The transport dolly of claim 1 including an attachment arm secured at one end to one of the pad members of each of a pair of said dollies, and a tie bar pivotally interconnecting the opposite ends of said attachment arms.

16. The transport dolly of claim 1 including power means interengaging the control member and one control arm of one of the first and second pairs of control members for pivoting said control arm relative to the control member.

17. The transport dolly of claim 16 wherein the power means comprises an extensible fluid pressure piston-cylinder unit.

* * * * *